(12) United States Patent
Hussain et al.

(10) Patent No.: US 8,243,815 B2
(45) Date of Patent: Aug. 14, 2012

(54) SYSTEMS AND METHODS OF VIDEO COMPRESSION DEBLOCKING

(75) Inventors: Zahid Hussain, Ascot (GB); Kiumars Sabeti, San Jose, CA (US)

(73) Assignee: VIA Technologies, Inc., Taipei (TW)

( * ) Notice: Subject to any disclaimer, the term of this patent is extended or adjusted under 35 U.S.C. 154(b) by 1415 days.

(21) Appl. No.: 11/763,751

(22) Filed: Jun. 15, 2007

(65) Prior Publication Data

US 2007/0291858 A1      Dec. 20, 2007

Related U.S. Application Data

(60) Provisional application No. 60/814,623, filed on Jun. 16, 2006.

(51) Int. Cl.
*H04N 7/50* (2006.01)
(52) U.S. Cl. .................................. 375/240.22
(58) Field of Classification Search .............. 375/240.29
See application file for complete search history.

(56) References Cited

U.S. PATENT DOCUMENTS

| | | | | |
|---|---|---|---|---|
| 5,627,657 | A | * | 5/1997 | Park .............................. 386/290 |
| 5,973,748 | A | | 10/1999 | Horiguchi et al. |
| 6,064,450 | A | * | 5/2000 | Canfield et al. .......... 375/240.29 |
| 6,496,537 | B1 | | 12/2002 | Kranawetter et al. |
| 6,717,988 | B2 | | 4/2004 | Peng |
| 6,871,001 | B1 | | 3/2005 | Okada |
| 7,684,489 | B2 | | 3/2010 | Johansen et al. |
| 2004/0071217 | A1 | | 4/2004 | Lin |
| 2005/0122341 | A1 | | 6/2005 | MacInnis et al. |
| 2005/0262276 | A1 | | 11/2005 | Singh et al. |
| 2006/0078052 | A1 | | 4/2006 | Dang |

FOREIGN PATENT DOCUMENTS

| | | |
|---|---|---|
| JP | 2001-285802 | 10/2001 |
| WO | 2004/030369 | 4/2004 |
| WO | 2004/091101 | 10/2004 |
| WO | WO 2004/105399 | 12/2004 |

OTHER PUBLICATIONS

English language translation (computer-generated translation) of JP 2001-285802 (published Oct. 12, 2001).

* cited by examiner

*Primary Examiner* — Gilberto Barron, Jr.
*Assistant Examiner* — Simon Kanaan
(74) *Attorney, Agent, or Firm* — Thomas, Kayden, Horstemeyer & Risley, LLP

(57) ABSTRACT

An exemplary graphics processing unit (GPU) comprises a decoder and a video processing unit. The decoder is configured to decode a first and a second deblocking filter acceleration instruction. The first and second deblocking filter instructions are associated with a deblocking filter used by a particular video decoder. The video processing unit is configured to receive encoded by the deblocking filter acceleration instructions, and to determine first and second memory sources specified by the received parameters as one of a plurality of memory sources located on the GPU. The video processing unit is further configured to load a first block of pixel data from the first memory source, and to apply the deblocking filter to the first block of pixel data, and to load a second block of pixel data from the second memory source, and to apply the deblocking filter to the second block of pixel data.

18 Claims, 14 Drawing Sheets

```
MODULE DEF.
SECTION 410      MODULE VC1_INLOOP_FILTER(T#, S#, U, V);
                 INPUT  REG [] T#;
                 INPUT  REG [] S#;
ITERATION        INPUT  REG [15:0]  U, V;
SECTION 420
                 FOR I (2, 0, 1, 3){
                     IF (VERTICAL){
                         P[1] = MA[0][I];
                         P[2] = MA[1][I];
                         P[3] = MA[2][I];
                         P[4] = MA[3][I];
   TEST              P[5] = MA[4][I];
 VERTICAL            P[6] = MA[5][I];
SECTION 430          P[7] = MA[6][I];
                     P[8] = MA[7][I];
                 } ELSE {
                     P[1] = MA[I][0];
                     P[2] = MA[I][1];
                     P[3] = MA[I][2];
                     P[4] = MA[I][3];
                     P[5] = MA[I][4];
                     P[6] = MA[I][5];
                     P[7] = MA[I][6];
                     P[8] = MA[I][7];
                 }

TEST 3RD LINE
SECTION 440      IF (I == 2){
                     ProcessingPixel3 = 1;
                     FILTER_OTHER_3 = 1;
                 } ELSE ProcessingPixel3 = 0;

INSTANTIATE
SECTION 450      VC_1_INLOOPFILTER_LINE(P,
                     FILTER_OTHER_3,
                     PQUANT,
                     ProcessingPixel3);
                 }
                 ENDMODULE
```

FIG. 4

```
                 ┌─ MODULE VC_1_INLOOPFILTER_LINE(P, FILTER_OTHER_3,
MODULE DEF       │  PQUANT, ProcessingPixel3);
  SECTION        │  INOUT REG [7:0] P[1:8];
    510          │  INOUT REG FILTER_OTHER_3;
                 │  INPUT REG [7:0] PQUANT;
                 └─ INPUT REG ProcessingPixel3;

┌─ A0[I]=(2(P3[I]-P6[I])- 5(P4[I]-P5[I])+ 4) >> 3
  PIXEL          │  A1[I]=abs((2(P1[I]-P4[I])- 5(P2[I]-P3[I])+4)>> 3)
  CALC           │  A2[I]=abs((2(P5[I]-P8[I])- 5(P6[I]-P7[i])+4)>> 3)
 SECTION         │  A3[I]=min(A1[I], A2[I])
   520           │  D[I]=(5(sgn(A0[I])* A3[I] - A0[I])) >> 3
                 │  CLIP[I]=(P4[I]- P5[I])>> 1
                 │  IF (CLIP[I] > 0){
                 │      IF (D[I] < 0) D[I]=0
                 │      IF (D[I] > CLIP[I]) D[I]=CLIP[I]
                 │  } ELSE {
                 │      IF (D[I] > 0) D[I] = 0
                 │      IF (D[I} < CLIP[I]) D[I]=CLIP[I]
                 └─ }

//set appropriate predicate
  TEST 3^RD      ┌─ IF (ProcessingPixel3){
    PIXEL        │      DO_FILTER = TRUE;
  SECTION 530    │      AA0 = abs(A0[3])
                 │      Cond1 = (AA0 >= PQUANT)
                 │      Cond2 = (A3[3] >= AA0)
                 │      Cond3 = (CLIP[3] == 0)
                 │      IF (!Cond1 || !Cond2 || Cond3)
                 │          DO_FILTER = FALSE
                 │  } ELSE
                 └─     DO_FILTER = FILTER_OTHER_3

TEST DO_FILTER   ┌─ IF (DO_FILTER){
  SECTION 540    │      P4[I]=P4[I]- D[I]
                 │      P5[I]=P5[I]+ D[I]
                 └─ }
 UPDATE STATE
  SECTION 450    ┌─ IF (ProcessingPixel3)
                 │      FILTER_OTHER_3 = DO_FILTER
                    ENDMODULE
```

```
                    ┌─ 700
                    ▼
MODULE DEF.    MODULE H264_INLOOP_FILTER(T#, S#, U, V);
SECTION 710    INPUT  REG []    T#;
               INPUT  REG []    S#;
               INPUT  REG [15:0]  U, V;
ITERATION
SECTION 720    FOR I (2, 0, 1, 3){
                 IF (VERTICAL){
                   P[1] = MA[0][I];
                   P[2] = MA[1][I];
                   P[3] = MA[2][I];
                   P[4] = MA[3][I];
   TEST          P[5] = MA[4][I];
 VERTICAL        P[6] = MA[5][I];
SECTION 730      P[7] = MA[6][I];
                   P[8] = MA[7][I];
                 } ELSE {
                   P[1] = MA[I][0];
                   P[2] = MA[I][1];
                   P[3] = MA[I][2];
                   P[4] = MA[I][3];
                   P[5] = MA[I][4];
                   P[6] = MA[I][5];
                   P[7] = MA[I][6];
                   P[8] = MA[I][7];
                 }
EXTRACT PARAMS   Q = I * 16;
SECTION 740      bS = Control_2[Q+3:Q+1];
                 indexA = Control_2[Q+9:Q+4];
                 indexB = Control_2[Q+15:Q+10];
                 H264_DEBLOCK_FILTER_LINE(P, bS,
INSTANTIATE           chromaEdgeFlag, left_top,
SECTION 750           indexA, indexB);
                 H264_DEBLOCK_FILTER_LINE(P, bS,
                      chromaEdgeFlag, !left_top,
                      indexA, indexB);
               }
               ENDMODULE
```

MODULE DEF.
SECTION
810

```
MODULE H264_DEBLOCK_FILTER_LINE(P, bS,
chromaEdgeFlag, left_top, indexA, indexB);
INOUT REG [7:0] P[0:7];
INPUT REG [2:0] bS;
INPUT REG chromaEdgeFlag;
INPUT REG left_top;
INPUT REG [5:0] indexA;
INPUT REG [5:0] indexB;
```

MAP
PARAMS
SECTION
820

```
getAlphaBeta(Alpha, Beta, IndexA, IndexB);
getThreshold(tc, Tc0, bS, IndexA, Beta,
chromaEdgeFlag, p[3],p[1], p[4], p[6]);
```

PIXEL
CALC
SECTION
830

```
IF (bS > 0 && bS < 4){
// compute pixel values per H.264 spec
// based on alpha, beta, chromaedge, and
//neighboring pixel values
}

IF (bS == 4){
// compute pixel values per H.264 spec
// based on alpha, beta, chromaedge, and
neighboring pixel values
}
ENDMODULE
```

FIG. 8A

```
MODULE getAlphaBeta(Alpha, Beta, IndexA, IndexB)
OUTPUT REG [7:0] Alpha;
OUTPUT REG [7:0] Beta;
INPUT  REG [5:0] IndexA;
INPUT  REG [5:0] IndexB;

ROMTable [7:0] TableAlpha[0:255];
ROMTable [4:0] TableBeta[0:255];

Alpha = TableAlpha[IndexA];
Beta  = {3'b0, TableBeta[IndexB]}; //zero-extend
ENDMODULE
```

— 850

```
MODULE getThreshold(tc, Tc0, bS, IndexA, Beta,
chromaEdgeFlag, p0,p2, q0, q2)
OUTPUT REG [4:0] tc;
OUTPUT REG [4:0] Tc0;
INPUT  REG [2:0] bS;
INPUT  REG [5:0] IndexA;
INPUT  REG [7:0] Beta;
INPUT  REG chromaEdgeFlag;
INPUT  REG [7:0] p0, p2, q0, q2;
WIRE [1:0] t0;
WIRE apt, aqt;
ROMTable [4:0] TableThr[1:3][0:51];
REG [4:0] Tc0;

Tc0 = TableThr[bS][IndexA];
apt = (abs(p2-p0) < Beta ? 1 : 0);
aqt = (abs(q2-q0) < Beta ? 1 : 0);
IF (chromaEdgeFlag) t0 = 1;
ELSE t0 = apt + aqt;
Tc = Tc0 + t0;
ENDMODULE
```

|  | C1 | C2 | C3 | C4 |
|---|---|---|---|---|
| R1 | R1,C1 | R1,C2 | R1,C3 | R1,C4 |
| R2 | R2,C1 | R2,C2 | R2,C3 | R2,C4 |
| R3 | R3,C1 | R3,C2 | R3,C3 | R3,C4 |
| R4 | R4,C1 | R4,C2 | R4,C3 | R4,C4 |

Edge labels: e, f, g, h (right side); a, b, c, d (bottom).

FIG. 10

SYSTEMS AND METHODS OF VIDEO COMPRESSION DEBLOCKING

CROSS REFERENCE TO RELATED APPLICATIONS

This application claims the benefit of U.S. Provisional Application No. 60/814,623, filed Jun. 16, 2006.

FIELD OF THE DISCLOSURE

The present disclosure relates to video compression and decompression, and more specifically to a graphics processor unit that contains features for video compression and decompression.

BACKGROUND

Personal computers and consumer electronic devices are used for a variety of entertainment functions. These entertainment functions can be roughly divided into two different types: that which uses computer-generated graphics, such as computer games; and that which uses compressed video streams, such as programs pre-recorded onto digital video disk (DVD), and digital programming provided to a set-top box by cable or satellite operators. The second type also includes encoding of analog video streams, such as performed by a digital video recorder (DVR).

Computer-generated graphics are typically generated by a graphics processing unit (GPU). A GPU is a specialized type of microprocessor found on computer game consoles and some personal computers. A GPU is optimized to perform fast rendering of three-dimensional primitive objects such as triangles, quadrilaterals, etc. The primitives are described with vertices, where each vertex has attributes (e.g., color), and textures can be applied to the primitives. The result of the rendering is a two-dimensional array of pixels which appears on a computer display or monitor.

Encoding and decoding of video streams involves computations of a different sort (e.g., discrete cosine transform, motion estimation, motion compensation, deblocking filters) These computations are typically handled by a general purpose central processing unit (CPU) in combination with specialized hardware logic such as application-specific integrated circuits (ASICs). Consumers therefore need multiple computing platforms to meet their entertainment needs. A single computing platform that handles both computer-generated graphics and video encoding and/or decoding is therefore desirable.

SUMMARY

Disclosed herein are embodiments for video compression deblocking. At least one embodiment of a graphics processing unit includes a decoder and a video processing unit. The decoder is configured to decode a first and a second deblocking filter acceleration instruction. The first and second deblocking filter instructions are associated with a deblocking filter used by a particular video decoder. The video processing unit is configured to receive encoded by the deblocking filter acceleration instructions, and to determine first and second memory sources specified by the received parameters as one of a plurality of memory sources located on the GPU. The video processing unit is further configured to load a first block of pixel data from the first memory source, and to apply the deblocking filter to the first block of pixel data, and to load a second block of pixel data from the second memory source, and to apply the deblocking filter to the second block of pixel data.

At least one embodiment of a graphics processing unit includes a video processing unit, a decoder, a texture filter unit, and an execution unit. The video processing unit is configured to apply a deblocking filter associated with a particular video decoder. The decoder is a decoder configured to decode a plurality of deblocking filter acceleration instructions associated with the deblocking filter. The texture filter unit is configured to provide pixel data to the video processing unit for application of the deblocking filter. The execution unit is configured to perform a graphics processing function on pixel data. The video processing unit is further configured to receive parameters encoded by each of the deblocking filter acceleration instructions. The video processing unit is further configured to determine whether a first memory source specified by the received parameters corresponds to the texture filter unit or the execution unit, and to determine whether a second memory source specified by the received parameters corresponds to the texture filter unit or the execution unit. The video processing unit is further configured to wherein to load a first block of pixel data from the first memory source and a second block of pixel data from the second memory source, and to apply the deblocking filter to the first block of pixel data and to apply the deblocking filter to the second block of pixel data in accordance with the received parameters.

At least one embodiment of a video encoder includes a plurality of execution unit instructions and a plurality of inloop deblocking filter (IDF) instructions. The execution unit instructions are configured to compute at least one inloop deblocking filter configuration parameter associated with a block of pixel data and with a filter used by a particular video encoding specification. The execution unit instructions are further configured to execute on a shader execution unit within a graphics processing unit (GPU). The IDF instructions are configured to apply an inloop deblocking filter in accordance with the computed filter configuration parameter, and to execute on a video processing unit within the GPU.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 4 is a listing of hardware description pseudocode for the IDF hardware acceleration logic 400 from FIG. 1.

FIG. 5 is a listing of hardware description pseudocode for the line acceleration logic 500 from FIG. 4.

FIG. 7 is a listing of hardware description pseudocode for one embodiment of H.264 hardware acceleration unit FIGS. 8A and 8B are a listing hardware description pseudocode for line acceleration logic 800 from FIG. 7.

FIG. 10 is a block diagram of a 16×16 macroblock as used in H.264.

DETAILED DESCRIPTION

The embodiments disclosed herein provide systems and methods for video compression deblocking. An exemplary graphics processing unit (GPU) comprises: an instruction decoder; and a video processing unit. The instruction decoder is configured to decode a plurality of deblocking filter acceleration instructions. The deblocking filter instructions are associated with a filter used by a particular video decoder. The video processing unit (VPU) is configured to receive parameters encoded by the deblocking filter acceleration instructions. The VPU is further configured to determine one of a plurality of first pixel data sources from the received parameters. The VPU is further configured to determine one of a plurality of second pixel data sources from the received parameters. The VPU is further configured to load a first block of pixel data from the determined first pixel data source. The VPU is further configured to load a second block of pixel data from the determined second pixel data source.

Computing Platform for Video Encoding/Decoding

Figure 1:
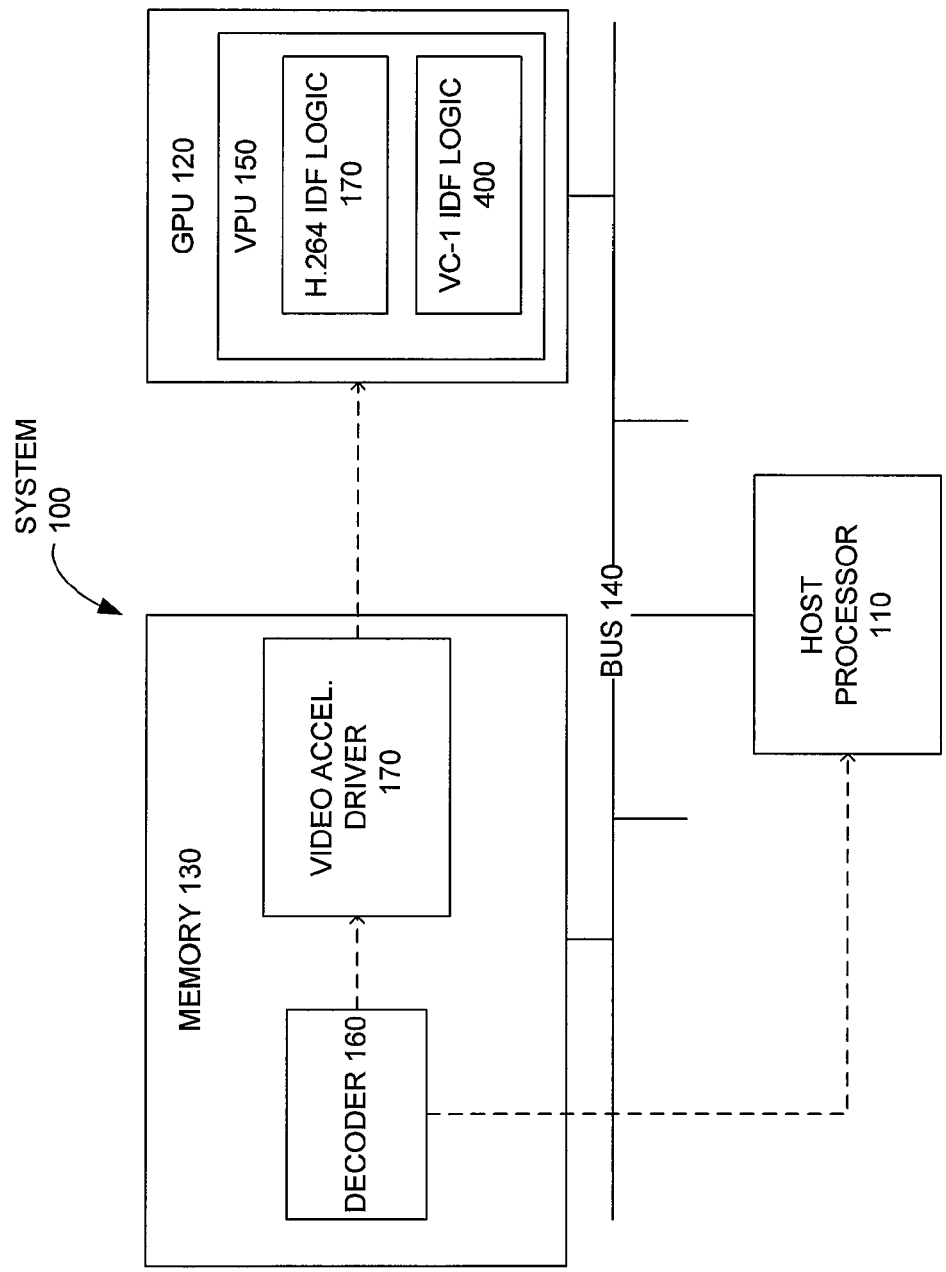
FIG. 1 is a block diagram of an exemplary computing platform for both graphics and video encoding and/or decoding.

FIG. 1 is a block diagram of an exemplary computing platform for both graphics and video encoding and/or decoding. System 100 includes a general purpose CPU 110 (hereinafter referred to as host processor), a graphics processor (GPU) 120, memory 130, and bus 140. GPU 120 includes a video acceleration unit 150 (also known as VPU 150) which accelerates video encoding and/or decoding, as will be described herein. The video acceleration functions of GPU 120 are made available as instructions which execute on GPU 120.

Software decoder 160 and video acceleration driver 170 reside in memory 130, and at least some portion of decoder 160 and video acceleration driver 170 execute on host processor 110. Through a host processor interface 180 provided by video acceleration driver 170, decoder 160 can also cause video acceleration instructions to be issued to GPU 120. Thus, system 100 performs video encoding and/or decoding through host processor software which issues video acceleration instructions to GPU 120, with GPU 120 responding to these instructions by accelerating some portions of decoder 160.

In some embodiments, only a relatively small portion of decoder 160 executes on host processor 110, while a larger portion of decoder 160 is performed by GPU 120, with very minimal driver overhead. In this manner, computationally intensive blocks which are frequently executed are offloaded to GPU 120, while more complex operations are performed by host processor 110.

In some embodiments, one of the computationally intensive functions implemented by VPU 150 within GPU 120 includes inloop deblocking filter (IDF) hardware acceleration logic 400, also known as inloop deblocking filter 400 or deblocking filter 400. Some embodiments of VPU 150 contain multiple instances of IDF hardware acceleration logic, for example, to accommodate the filters specified by different encoding standards such as VC-1 and H.264. Such an embodiment is shown in FIG. 1, where VPU 150 includes H.264 IDF hardware acceleration logic 170 and VC-1 IDF hardware acceleration logic 400 (described later in connection with FIG. 4). Another example of a computationally intensive function is determining the boundary strength (bS) for each filter.

The architecture described herein thus allows the flexibility of either: executing decoder 160 on host processor 110 with specific functions (such as deblocking or computation of boundary strength) performed on a macroblock (or picture basis) through running a shader program; or executing large portions of decoder 160 on GPU 120, which exploits pipelining and parallelism. In some embodiments where decoder 160 executes on GPU 120, the deblocking process is a thread with synchronization between the various aspects of the decoder 160.

Figure 2:
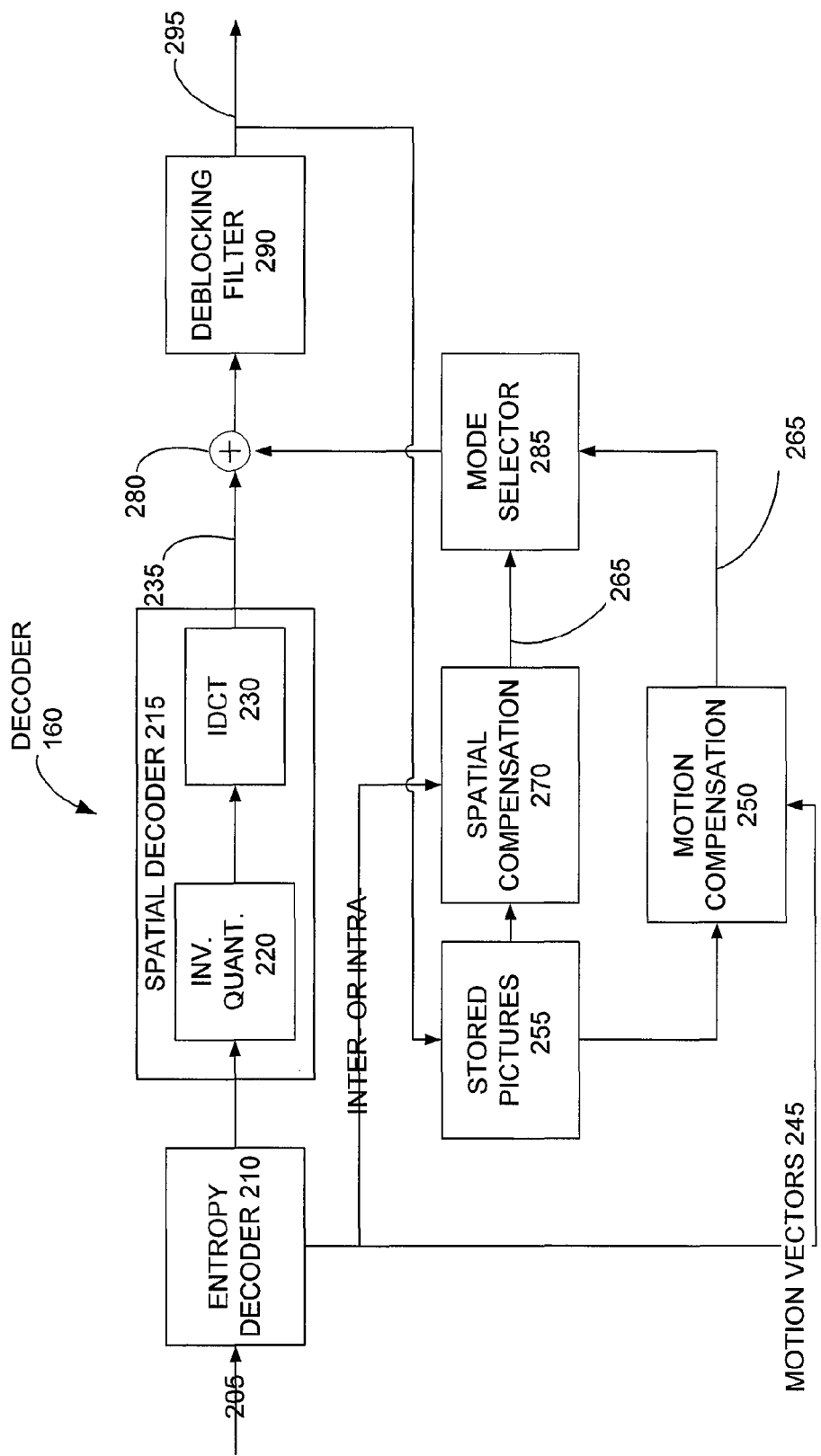
FIG. 2 is a functional diagram of the video decoder 160 from FIG. 2.

Omitted from FIG. 1 are a number of conventional components, known to those skilled in the art, that are unnecessary to explain the video acceleration features of GPU 120.
Video Decoder FIG. 2 is a functional diagram of the video decoder 160 of FIG. 1. In the particular embodiment illustrated in FIG. 2, decoder 160 implements the ITU H.264 video compression standard. However, a person of ordinary skill in the art should understand that the decoder 160 of FIG. 2 is a basic representation of a video decoder that also illustrates operation of other types of decoders that are similar to H.264, such as the SMPTE VC-1 and MPEG-2 standards. Furthermore, although illustrated as part of a GPU 120, a person of ordinary skill in the art should also understand that portions of decoder 160 disclosed herein may also be implemented outside of a GPU, for example, as standalone logic, as part of an application specific circuit (ASIC), etc.

The incoming bit stream 205 is first processed by an entropy decoder 210. Entropy encoding takes advantage of statistical redundancy: some patterns occur more commonly than others, so the commonly occurring ones are represented with shorter codes. Examples of entropy encoding include Huffman coding and run-length encoding. After entropy decoding, the data is processed by a spatial decoder 215, which takes advantage of the fact that neighboring pixels within a picture are often the same, or are related, so that only the differences are encoded. In this example embodiment, spatial decoder 215 comprises an inverse quantizer 220, then an inverse discrete cosine transform (IDCT) function 230. The output of IDCT function 230 can be considered to be a picture (235), composed of pixels.

Picture 235 is processed in smaller subdivisions called macroblocks. The H.264 video compression standard uses a macroblock size of 16×16 pixels, but other compression standards may use different sizes. Macroblocks within picture 235 are combined with information in previously decoded picture(s), a process called "inter prediction", or with information in other macroblocks in current picture 235, a process called "intra prediction". The incoming bit stream 205, as decoded by entropy decoder 210, specifies the type of picture and thus whether inter- or intra-prediction is to be applied.

When inter-prediction is applied, entropy decoder 210 produces a motion vectors 245 output. Motion vectors 245 are used for temporal encoding, which takes advantage of the fact that often many pixels in a series of pictures will have the same value. The changes from one picture to the next are encoded as motion vectors 245. Motion compensation block 250 combines motion vectors 245 with one or more previously decoded pictures 255 to produce a prediction picture (265). When inter-prediction is applied, spatial compensation block 270 combines the current macroblocks in picture 235 with information from neighboring macroblocks to produce a prediction picture (275).

Combiner 280 adds current picture 235 to the output of mode selector 285. Mode selector 285 uses information in the entropy-decoded bit stream to determine whether combiner 280 uses the prediction picture (265) produced by motion compensation block 250, or uses the picture (275) produced by spatial compensation block 270.

The encoding process introduces artifacts such as discontinuities along macroblock borders, and along sub-block borders within macroblocks. The result is that "edges" appear in the decoded frame where none appeared in the original. Inloop deblocking filter 290 is applied to the combined picture, output by combiner 280, to remove these edge artifacts. The decoded picture (295) produced by inloop deblocking filter 290 is stored for use in decoding future pictures.

As discussed earlier in connection with FIG. 1, portions of decoder 160 run on host processor 110, but decoder 160 also takes advantage of video acceleration instructions provided by GPU 120. Specifically, some embodiments of inloop deblocking filter 290 use one or more instructions provided by GPU 120 to implement the filter with a relatively low computational cost.

Inloop deblocking filter 290 is a multi-tap filter which modifies pixel values on the edge of sub-blocks based on nearby pixel values. Different embodiments of inloop deblocking filter 290 can be used depending on the compression standard implemented by decoder 160. Each standard uses different filter parameters, e.g., the size of the sub-block, the number of pixels updated by the filtering operation, the frequency with which the filter is applied (e.g., every Nth row or Mth column). Furthermore, each standard uses a different configuration of filter taps. A person of ordinary skill in the art should understand multi-tap filters, so specific tap configurations will not be discussed here.

VC-1 Deblocking Filter

An implementation of the deblocking filter specified by the VC-1 standard will be described below in connection with FIG. 4. First the sub-block pixel arrangement for the VC-1 filter will be described in connection with FIG. 3.

Figure 3:
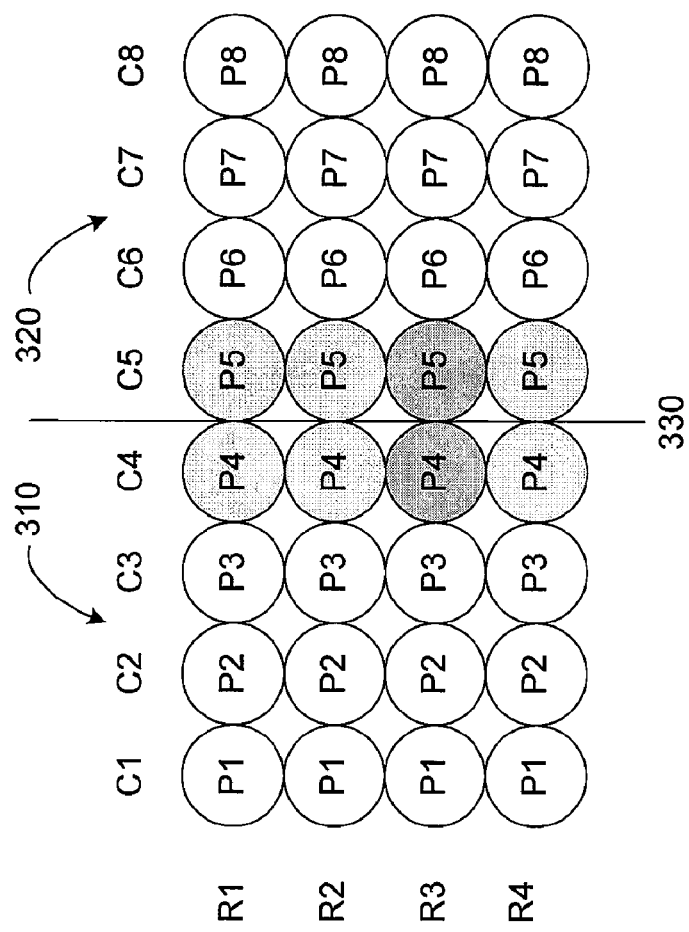
FIG. 3 illustrates the sub-block pixel arrangement for a VC-1 filter.

FIG. 3 shows two adjacent 4×4 sub-blocks (310, 320), identified as rows R1-R4 and columns C1-C8. The vertical edge 330 between these two sub-blocks is along columns C4 and C5. The VC-1 filter operates on each 4×4 sub-block. For the leftmost sub-block, the VC-1 filter examines the pixels in a predefined group of pixels (P1, P2, and P3) in a predefined row (R3). If the predefined group of pixels meets a specific criteria, another pixel (P4) in the same predefined row is updated. The criteria is defined by a particular set of calculations and comparisons of the pixels in the predefined group. A person of ordinary skill in the art will recognize that these calculations and comparisons can also be viewed as a set of taps, and details of the calculations and the comparisons will be discussed later in connection with FIG. 5.) The updated value is also based on calculations performed on the pixels in the predefined group.

The VC-1 filter treats the rightmost sub-block in an analogous manner, determining whether the pixels P6, P7, and P8 meet a criteria, and updating P5 if that criteria is met. In other words, the VC-1 filter computes the values for a predefined group of pixels—edge pixels P4 and P5—of the a predefined row (R3), based on values in another predefined group of pixels in the same row—the value of P4 depends on P1, P2, and P3, and the value of P5 depends on P6, P7, and P8.

The VC-1 filter conditionally updates the same predefined group of pixels in the remaining rows, depending on the computed values for the predefined groups of pixels (edge pixels P4 and P5) in the predefined row (R3). Thus, P4 in R1 is updated, based on P1, P2 and P3 also in R1, but only if P4 and P5 in R3 are updated. Similarly, P5 in R1 is updated, based on P6, P7, and P8, but only if P4 and P5 in R3 are updated. Rows R2 and R4 are handled in a similar manner.

Viewed another way, some pixels in a predefined third row of pixels are filtered, or updated, if other pixels in the third row meet a criteria. The filter involves comparisons and calculations performed on these other pixels. If these other pixels in the third row do meet the criteria, corresponding pixels in the remaining rows are filtered in an analogous manner, as described above. Some of the embodiments of inloop deblocking filter 290 disclosed herein use an inventive technique in which the third row is filtered first, and the remaining rows are filtered after the third row. These inventive techniques will be described in more detail in connection with FIGS. 4, 5, and 6A-6D.

Although FIG. 3 illustrates vertical edge processing by rows, a person of ordinary skill in the art should understand that the same diagram, when rotated 90° clockwise, also describes horizontal edge processing by columns. A person of ordinary skill in the art should also appreciate that although VC-1 uses the third row of four as the predefined row which determines the conditional update of the other rows, the principles disclosed herein also apply to embodiments in which a different predefined row is used (e.g., the first row, the second row, etc.), and to still other embodiments in which a different number of rows forms a sub-block. Similarly, a person of ordinary skill in the art should also appreciate that although VC-1 examines the values in a group of neighboring pixels to set the value of the updated pixel, the principles disclosed herein also apply to embodiments in which other pixels are examined and other pixels are set. As just one example, P2 and P3 may be examined to determine the updated value of P4. As yet one more example, P3 may be set based on the values in P2 and P4.

Video acceleration unit 150 in GPU 120 implements hardware acceleration logic for an inloop deblocking filter (IDF), for example, the IDF specified by VC-1. A GPU instruction exposes this hardware acceleration logic, as will be described later. The conventional approach to implementing a VC-1 IDF processes each row/column in parallel, since the same pixel calculations are performed on each row/column of a sub-block. This conventional approach filters two adjacent 4×4 sub-blocks every cycle, but requires an increased gate count to do so. In contrast, an inventive approach used by VC-1 IDF hardware acceleration logic 400 processes the third row/column pixels first, and if these pixels meet the required criteria, then sequentially processes the remaining 3 rows/columns. This inventive approach uses fewer gates than the conventional approach, which replicates functionality for each row/column. The sequential row processing of VC-1 IDF hardware acceleration logic 400 filters two adjacent 4×4 sub-blocks every four cycles. This longer filter time is consistent with the instruction cycle of GPU 120, where the faster filter of the conventional approach is actually faster than necessary, at the expense of gate count.

FIG. 4 is a listing of hardware description pseudocode for VC-1 IDF hardware acceleration logic 400. Although pseudocode is used rather than an actual hardware description language (HDL), such as Verilog and VHDL, a person of ordinary skill in the art should be familiar with such pseudocode. Such a person should also understand that when expressed in an actual HDL, the code can be compiled and then synthesized into an arrangement of logic gates which makes up a portion of video acceleration unit 150. Such a person should also understand that these logic gates may be implemented by various technologies, for example, an application specific circuit (ASIC), programmable gate array (PGA), or field programmable gate array (FPGA).

Section 410 of the code is the module definition. VC-1 IDF hardware acceleration logic 400 has several input parameters. The sub-block to be filtered is specified by the Block parameter. If the Vertical parameter is True, then the acceleration logic 400 treats the Block parameter as a 4×8 block (see FIG.

3) and performs vertical edge filtering. If the Vertical Parameter is False, then the acceleration logic 400 treats the Block parameter as an 8×4 input block and performs horizontal edge filtering.

Section 420 of the code starts an iteration loop, setting the value of the LoopIndex variable. The first time through the loop, LoopIndex is set to 3 so the third line is processed first. Subsequent loop iterations set LoopIndex to 1, 2, and then 4. Using this index, VC-1 IDF hardware acceleration logic 400 iterates through 4 lines, processing 8 pixels at a time, where a line is either a horizontal row or a vertical column, depending on the Vertical parameter. Each line is processed by line acceleration logic 500 (see FIG. 5). In some embodiments, this line acceleration logic 500 is implemented as an HDL submodule, as will be described in connection with FIG. 5.

Section 430 tests the Vertical parameter to determine whether vertical or horizontal edge filtering is to be performed. Depending on the result, the 8 elements of the Line array variable are initialized from the rows of a 4×8 input block or from columns of an 8×4 input block.

Section 440 determines if the third line is being processed, by comparing the LoopIndex (set by section 420) to 3. If LoopIndex is 3, two other control variables, ProcessingPixel3 and FilterOther3, are set to True. If LoopIndex is not 3, ProcessingPixel3 is set to True.

Section 450 instantiates another HDL module, VC1_IDC_Filter_Line, to apply the filter to the current line. (As described above in connection with FIG. 3, the line filter updates edge pixel values based on neighboring pixel values.) The parameters provided to the submodule include the control variables ProcessingPixel3 and FilterOther3 and the LoopIndex variable. In one embodiment, VC-1 IDF hardware acceleration logic 400 has an additional input parameter, a quantization value, and this quantization parameter is also provided to the submodule.

After the submodule processes the line, VC-1 IDF hardware acceleration logic 400 continues the iteration loop at section 420, with an updated value for LoopIndex. In this manner, the filter is applied to the third line, then the first line, then second line, then fourth line of the input block.

FIG. 5 is a listing of hardware description language code for line acceleration logic 500, which implements the submodule referred to above. Section 510 of the code is a module definition. Line acceleration logic 500 has several input parameters. The line to be filtered is specified by the Line input parameter. ProcessingPixel3 is an input parameter which is set to True by higher-level logic if this line is the 3rd row or column. The FilterOther3 parameter is initially set by higher-level logic to True, but is modified by line acceleration logic 500 based on pixel values.

Section 520 performs various pixel value calculations as specified by VC-1. (Since the calculations can be understood by reference to the VC-1 specification, no detailed discussion of these calculations is necessary.) Section 530 tests the ProcessingPixel3 parameter provided by higher level VC-1 IDF hardware acceleration logic 400. If ProcessingPixel3 is True, then section 530 initializes a control variable DoFilter to a default value of True. Various results of intermediate calculations in section 520 are used to determine if the other 3 lines should also be processed. If the pixel calculation results indicate that the other 3 lines are not to be processed, then DoFilter is set to False.

If ProcessingPixel is False, section 540 uses the input parameter FilterOther3 (set by higher level VC-1 IDF hardware acceleration logic 400) to set the value of DoFilter. Section 550 tests the DoFilter variable and updates the edge pixels P4 and P5 (see FIG. 3) in the Line variable if DoFilter is True.

Section 560 tests the ProcessingPixel3 parameter, and updates FilterOther3 appropriately. The FilterOther3 variable is used to convey state information between different instantiations of this module. If ProcessingPixel3 is True, then section 550 updates the FilterOther3 parameter with the value of DoFilter, as determined by section 540. This technique allows the higher-level module that instantiated this module (namely, VC1_InloopFilter) to provide the FilterOther3 value that was updated by this instantiation of the VC1_InLoopFilter_Line low-level module to another instantiation of VC1_InLoopFilter_Line.

A person of ordinary skill in the art should appreciate that the pseudocode of FIG. 5 can be synthesized in a variety of ways to produce an arrangement of logic gates which implements line acceleration logic 500. One such arrangement is depicted in FIGS. 6A-D, which together form a block diagram of line acceleration logic 500. A person of ordinary skill in the art should be familiar with the VC-1 in-loop deblocking filter algorithm, as well as with logic structures. Therefore, the components of FIGS. 6A-D will not all be discussed in detail. Instead, selected features of line acceleration logic 500 will be described.

As should be known to a person of ordinary skill in the art, the computations involved in the VC-1 in-loop deblocking filter include the following, where P1-P8 refer to pixel positions within the row/column being processed.

$$A0=(2*(P3-P6)-5*(P4-P5)+4)>>3$$

$$A1=(2*(P1-P4)-5*(P2-P3)+4)>>3$$

$$A2=(2*(P5-P8)-5*(P6-P7)+4)>>3$$

$$clip=(P4-P5)/2$$

Each of the first three computations involves three subtractions, two multiplications, an addition, and a shift right. The portion of line acceleration logic 500 depicted in FIG. 6A uses shared logic to compute A0, A1, and A2 sequentially, rather than using specific individual logic blocks for A0, A1, and A2. By avoiding replication of logic blocks, this sequential processing, using multiplexers to sequence through inputs, reduces gate count and/or power consumption.

Multiplexers 605, 610, 615 and 620 are used to select different inputs from pixel registers P1-P8 at different clock cycles, and these inputs are provided to various common logic blocks. Logic blocks 625 and 630 each perform a subtraction. Logic block 635 multiplies by 2 by performing a left-shift-by-1. A multiply-by-5 is performed by left-shift-by-1 (640) followed by addition 645. Adder 650 adds the output of left shift 635, a constant value of 4, and the negative of the output of 645. Finally, logic block 655 performs a shift-right-by-3.

In the first clock cycle an input of T=1 is provided to the each of multiplexers 605, 610, and 615, and the value of A1 is computed and stored in register 660. In the second clock cycle an input of T=2 is provided to each of multiplexers 605, 610, and 615, and the value of A2 is computed and stored in register 665. In the third clock cycle an input of T=3 is provided to each of multiplexers 605, 610, and 615, and the value of A0 is computed and stored in register 670. The values of A0, A1, and A2 stored in registers 665, 660, and 670 will be used by the portion of line acceleration logic 500 depicted in FIG. 6B, which will be described below. The output of the P4 register (671) and the output of the P5 register (673) will be used by the portion of line acceleration logic 500 depicted in FIG. 6C, which will also be described below.

A person of ordinary skill in the art should also be aware of the following additional computations involved in the VC-1 in-loop deblocking filter:

```
D = 5*((sign(A0) * A3) – A0)/8
if (CLIP > 0)
{
    if (D < 0)
        D = 0
    if (D > CLIP)
        D = CLIP
}
else
{
    if (D > 0)
        D = 0
    if (D < CLIP)
        D = CLIP
}
```

Figure 6A:
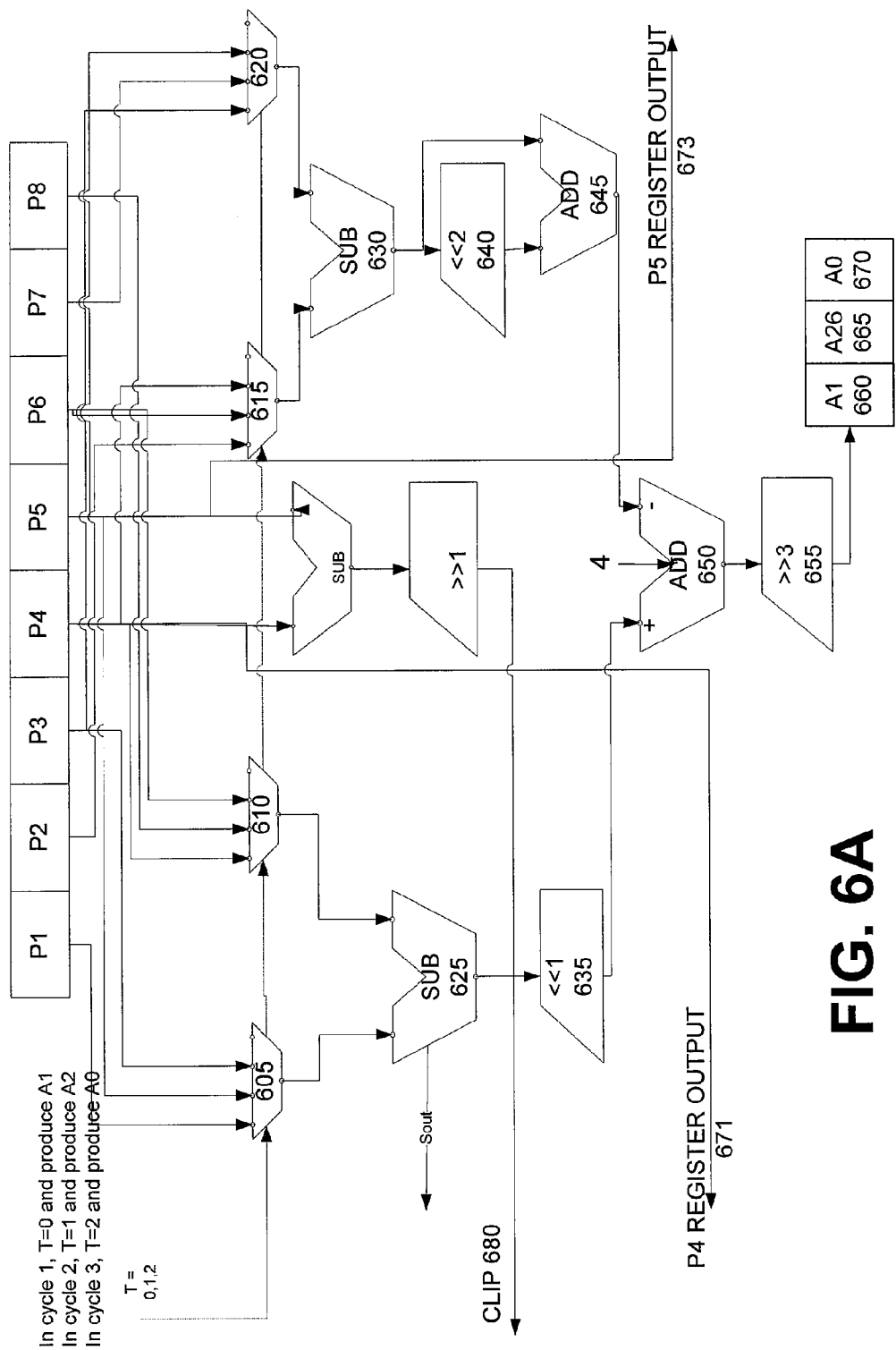
FIGS. 6A-6D form a block diagram of line acceleration logic 500 from FIGS. 4 and 5.
Figure 6B:
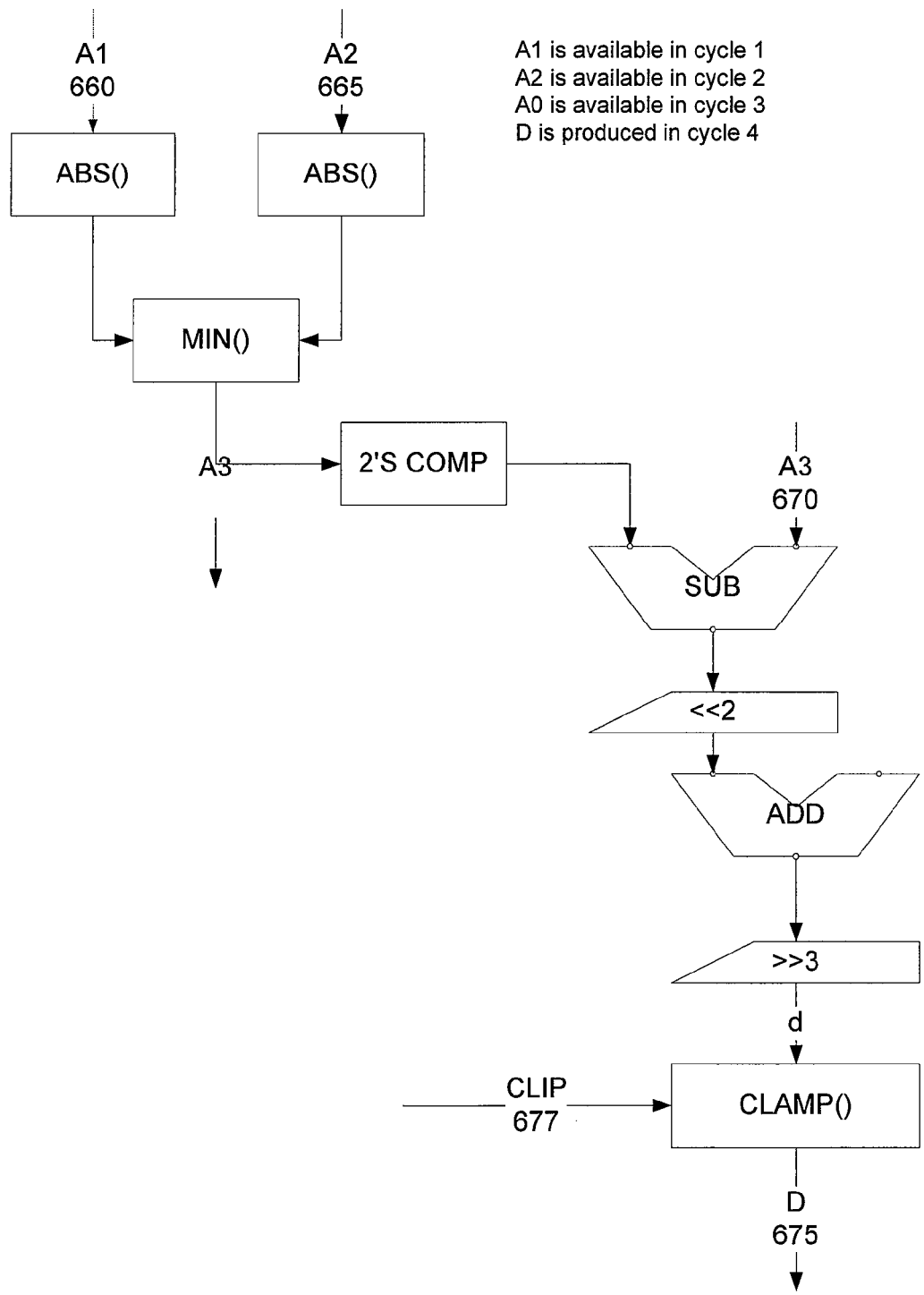

The portion of line acceleration logic 500 depicted in FIG. 6B receives inputs from the portion of line acceleration logic 500 depicted in FIG. 6A, and computes D (675). Referring again to FIG. 6A, CLIP (677) is produced as follows: pixels P4 and P4 are subtracted by logic block 679, and the result is shifted right (integer divide by 2) by logic block 680 to produce CLIP 677. Returning back to FIG. 6B, A1 from register 660 is available in the first cycle, A2 from register 665 is available in the second cycle, and A9 from register 670 is available in the third cycle. Thus, in the fourth cycle the portion of line acceleration logic 500 depicted in FIG. 6B computes D (675) according to the equation shown above.

Line acceleration logic 500 uses D (675) to update pixel positions P4 and P5. Specifically, P4=P4−D and P5=P5+D. Although FIGS. 6A and 6B were described earlier in connection with a single row/column (i.e., a single set of pixel positions P0-P8), computations for the third row/column of a sub-block affect the behavior of the other 3 rows/columns of the sub-block. line acceleration logic 500 uses an inventive approach to implement this behavior. While individual filtering computations are done up front—in parallel—described in connection with FIGS. 6A and 6B, the portions of line acceleration logic 500 shown in FIGS. 6C and 6D conditionally choose which positions to update. In other words, VC-1 IDF hardware acceleration logic 400 uses predication, where either the original value is written back, or the new value is written back. In contrast, a conventional approach to a VC-1 inloop deblocking filter uses looping, so that individual filtering computations are performed conditionally.

Figure 6C:
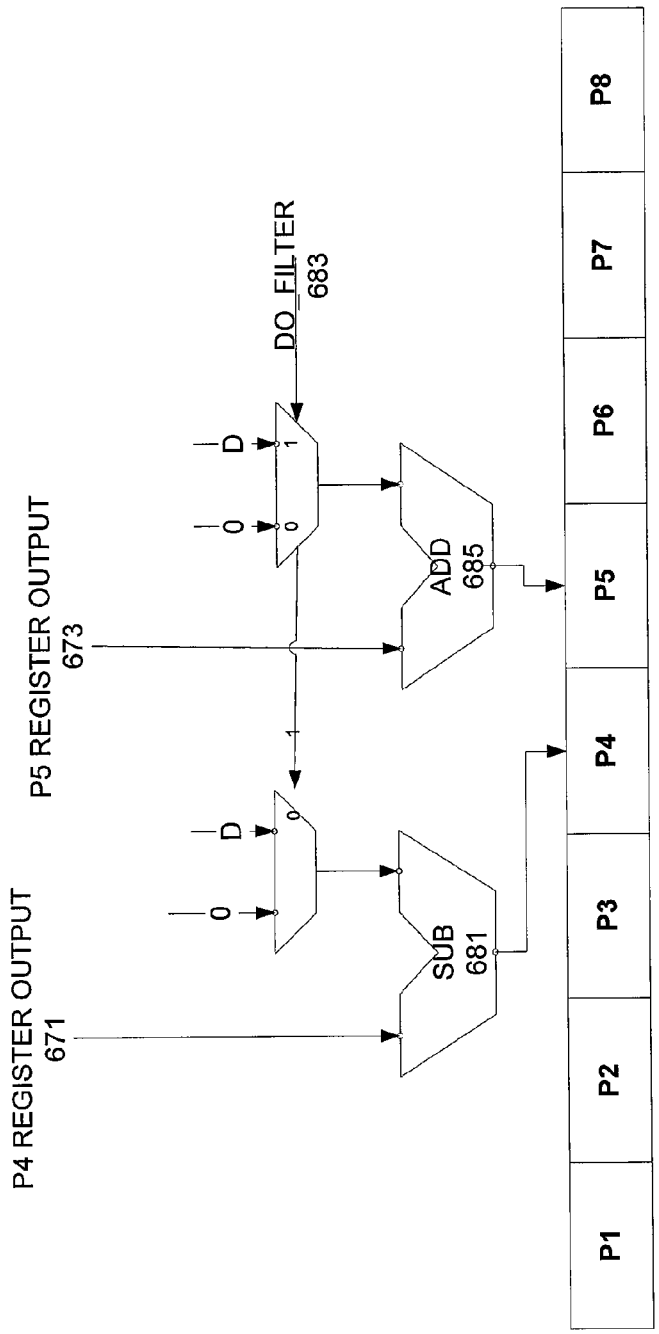

As explained earlier, the pseudocode of FIG. 4 which instantiates line acceleration logic 500 does so in a loop: instantiation section 450 appears within an iteration section 420. Furthermore, the instantiation of line acceleration logic 500 uses two parameters, ProcessingPixel3 and FilterOther3. These parameters are used by line acceleration logic 500 as follows to perform conditional update of pixel positions P4 and P5. Referring now to FIG. 6C, register P4 is written with the result of subtractor 681, where subtractor 681 has inputs P4 (671) and either 0 or D (675), depending on the value of DO_FILTER (683). Similarly, register P5 is written with the result of adder 685, where adder 685 has inputs P5 (673) and either 0 or D (675), depending on the value of DO_FILTER 683. Thus, the updated value for P4 is the original P4 value (if DO_FILTER is False) or P4−D. Similarly, the updated value for P5 is the original P5 value (if DO_FILTER is False) or P5+D.

A person of ordinary skill in the art should recognize that when processing the third row of a sub-block, the criteria for updating P4 with P4−D is:

$$((ABS(A0)<PQUANT)\text{OR}(A3<ABS(A0)))\text{OR}(CLIP!=0)$$

Figure 6D:
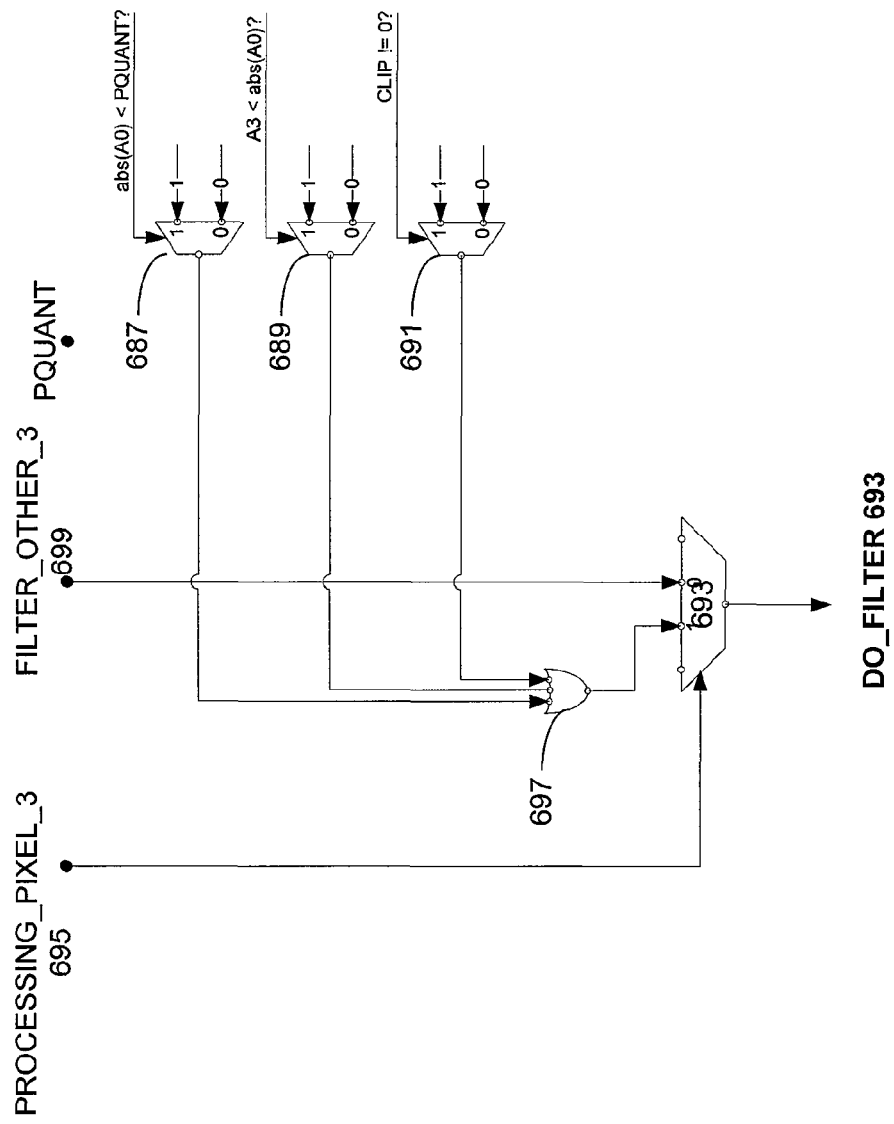

DO_FILTER 683 is computed by the portion of line acceleration logic 500 shown in FIG. 6D, which examines these conditions. Multiplexer 687 provides one input to OR-gate 697, selecting a TRUE output if ABS(A0)<PQUANT and FALSE otherwise. Multiplexer 689 provides another input to OR-gate 697, selecting a TRUE output if A3<ABS(A0) and FALSE otherwise. Multiplexer 691 provides another input to OR-gate 697, selecting a TRUE output if CLIP !=0, and FALSE otherwise.

DO_FILTER 683 is produced by multiplexer 693, which uses control input Processing_Pixel_3 (695) to select either the output of OR-gate 697 or the input signal Filter_Other_3 (699). Inputs Processing_Pixel_3 (695) and Filter_Other_3 (699) were introduced earlier in connection with FIG. 4 and the pseudo-code for higher level VC-1 IDF hardware acceleration logic 400 which instantiates line acceleration logic 500. Returning briefly to FIG. 4, Processing_Pixel_3 (695) is set to TRUE when processing the third row/column (first iteration) and FALSE otherwise. An intermediate variable Do_Filter records whether or not P4/P5 is updated, based on the conditions involving PQUANT, ABS(A0) and CLIP. Finally, the value of Filter_Other_3 (699) is set from this intermediate Do_Filter. The result of the logic portion of line acceleration logic 500 shown in FIGS. 6C and 6D is that every four cycles, the pixel positions P4 and P5 in four adjacent rows/columns are either set to filtered values (depending on variables such as A0-A3, PQUANT, CLIP, etc.) or are written again with their original values.

The VC-1 deblocking acceleration unit 400 employs an inventive combination of parallel and sequential processing, as just described. The parallel processing provides faster execution and reduces latency. Although this parallelization increases gate count, the increase is offset by the sequential processing described above. A conventional approach which did not use the sequential processing described above would further increase gate count.

H.264 Deblocking Filter

An embodiment of an inloop deblocking filter (IDF) as specified by VC-1 was described above. Some embodiments of GPU 120 contain a hardware acceleration unit for H.264 deblocking (700). A person of ordinary skill in the art should be familiar with the H.264 IDF, so only a brief overview of the filtering operation will be described. The H.264 IDF is a conditional filter which is applied to all 4×4 block edges of the picture unless the parameter Disable_Deblocking_Filter_IDC is defined for that edge. The filter is applied sequentially to all macroblocks in order of increasing macroblock address. For each macroblock, the vertical edges are filtered first from left to right, followed by horizontal filters from top to bottom (the inverse of the order applied by VC-1). Thus sample values from the macroblocks to the above and to the left of the current macroblock and previously filtered are used, and may be filtered again. The value modified by the horizontal filter is used as input to the vertical filter.

Some novel features of H.264 IDF hardware acceleration unit 700 will now be described in connection with the hardware description pseudocode in FIG. 7. Although pseudocode is used rather than an actual hardware description language (HDL), such as Verilog and VHDL, a person of ordinary skill in the art should be familiar with such pseudocode. Such a person should also understand that when expressed in an actual HDL, the code can be compiled and then synthesized into an arrangement of logic gates which makes up a portion of video acceleration unit 150. Such a person should also understand that these logic gates may be implemented by various technologies, for example, an application specific circuit (ASIC), programmable gate array (PGA), or field programmable gate array (FPGA).

Section 710 of the code is the module definition. H.264 IDF hardware acceleration logic 700 has several input parameters. The sub-block to be filtered is specified by the Block parameter. If the Vertical parameter is True, then the acceleration logic 700 treats the Block parameter as a 4×8 block and performs vertical edge filtering. If the Vertical Parameter is False, then the acceleration logic 700 treats the Block parameter as an 8×4 input block and performs horizontal edge filtering.

Section 720 of the code starts an iteration loop, setting the value of the LoopIndex variable. Using this index, H.264 IDF hardware acceleration logic 700 iterates through 4 lines, processing 8 pixels at a time, where a line is either a horizontal row or a vertical column, depending on the Vertical parameter. As will be explained in further detail below, each line is processed twice by line acceleration logic 800 (see FIG. 8).

Section 730 tests the Vertical parameter to determine whether vertical or horizontal edge filtering is to be performed. Depending on the result, the 8 elements of the Line array variable are initialized from the rows of a 4×8 input block or from columns of an 8×4 input block. When instantiated, this code in section 730 in combination with the iteration code in section 720 becomes multiplexing and bit-positioning logic (sometimes called "swizzling" logic) which moves bits from the input block in memory to appropriate bit positions in the P register as described by the code. Note that the code in these sections 720 and 7730 are the same as the analogous code for the VC-1 deblocking filter 400 in FIG. 4. As a result of this choice, a single multiplexing/swizzling logic block is generated and used by both the H.264 IDF logic 700 and the VC-1 IDF logic 400.

Section 750 extracts parameters used by the actual filter from information contained in the H.264 instruction exposed by GPU 120 (discussed later). The bS (boundary strength) and chromaEdgeFlag parameters are used by the H.264 IDF and should be familiar to a person of ordinary skill in the art. The indexA and indexB parameters correspond to the alpha and beta parameters used by the H.264 IDF, which should also be familiar to the person of ordinary skill in the art.

One inventive feature of GPU 120 is that indexA, indexB and bS parameters are not computed by H.264 IDF hardware acceleration logic 700, but are instead computed by an execution unit 940 within GPU 120 (discussed later in connection with FIG. 9). By using execution unit instructions to implement the calculations of the bSm indexA, and indexB, the computational power and flexibility of the GPU execution unit 940 can be exploited, augmenting the IDF hardware acceleration logic 700. This choice avoids the need for additional, possibly complex, logic within IDF hardware acceleration logic 700. In another embodiment, the indexA, indexB and bS parameters are computed by code running on host processor 110 (see FIG. 1).

Section 750 instantiates another HDL module, H264_Deblock_Filter_Line, to apply the filter to the current line. The parameters provided to the submodule include the control variables extracted from the execution unit instruction as described above, and the LeftTop parameter. One inventive feature of logic 700 is that the line filter is called twice—each call updates only half the pixels, where the half to be updated is indicated by the LeftTop parameter. This design tradeoff saves gates but requires more clock cycles. A person of ordinary skill in the art should understand how instantiating the filter line module twice with different parameter values results in different two logic blocks, having as input different halves of the pixel block.

After the submodule processes the line, logic 700 continues the iteration loop at section 420, with an updated value for LoopIndex. In this manner, the H264_Deblock_Filter_Line is applied to lines 1 to 4.

FIGS. 8A and 8B show hardware description pseudocode for line acceleration logic 800, which implements the H264_Deblock_Filter_Line submodule referred to above. As can be seen in FIG. 8A, the line module 800 is divided into module definition section 810, map parameters section 820, and calculate pixels section 830. Module definition section 810 should be understandable to a person of ordinary skill in the art from the code in FIG. 8A, and will not be explained further. Map parameters section 820 calls on two other subroutines (discussed in connection with FIG. 8B) to map from the IndexA and IndexB parameters provided by H.264 IDF hardware acceleration logic 700 to the alpha and beta parameters.

Alpha and beta, as well as the ChromaEdge flag, are then used by section 830 to actually apply the filter by calculating new pixel values based on alpha, beta, ChromaEdge, and neighboring pixel values. The actual pseudo code for this section is not shown since a person of ordinary skill in the art should understand how to implement a inloop deblocking filter for a single line as described in the H.264 specification.

Inventive features of line acceleration logic 800 are further shown in the logic sections getAlphaBeta 850 and getThreshold 870 shown in FIG. 8B. These logic sections correspond to subroutines used by map parameters section 820 in FIG. 8A. As can be seen in the code in FIG. 8B, read-only memory (ROM) tables are used to map from IndexA and IndexB to corresponding alpha and beta values. Similarly, a ROM table is used in computing the threshold value.

In some embodiments of GPU 120, where the H.264 deblocking function described above is exposed through GPU instructions. GPU 120 will now be described in further detail in connection with FIG. 10, with an emphasis on the particular choice of GPU instructions to expose H.264 deblocking acceleration.

Graphics Processor

Rationale for Multiple Deblocking Instructions

The instruction set of GPU 120 includes instructions that portions of decoder 160 running in software can use to accelerate a deblocking filter. An inventive technique described here provides not one, but multiple GPU instructions for acceleration of a particular deblocking filter. Inloop deblocking filter 290 is sequential in nature, in the sense that a particular filter implies an order in which pixels are filtered (e.g., H.264 specifies left to right then top to bottom). Thus, previously filtered and updated pixel values are used as inputs when filtering later pixels.

This sequential nature is a good match for a conventional deblocking filter implemented in software running on a host processor. The host processor accesses pixel values stored in conventional memory, which allows back-to-back pixel reads and writes. However, this sequential nature is not a good match when inloop deblocking filter 290 uses a GPU to accelerate portions of the filter process. A conventional GPU stores pixels in a texture cache, and the GPU pipeline design does not allow back-to-back reads and writes of the texture cache.

Some embodiments of GPU 120 disclosed herein provide multiple GPU instructions which can be used together to accelerate a specific deblocking filter. Some of the instructions use the texture cache as a source of pixel data, and some of the instructions use the GPU execution unit(s) as a source. Inloop deblocking filter 290 uses these different GPU instructions in appropriate combinations to achieve back-to-back pixel reads and writes. An overview of the data flow through GPU 120 is presented next, followed by further explanation of the deblocking acceleration instructions provided by GPU 120 and the use of these instructions by inloop deblocking filter 290.

GPU Flow

Figure 9:
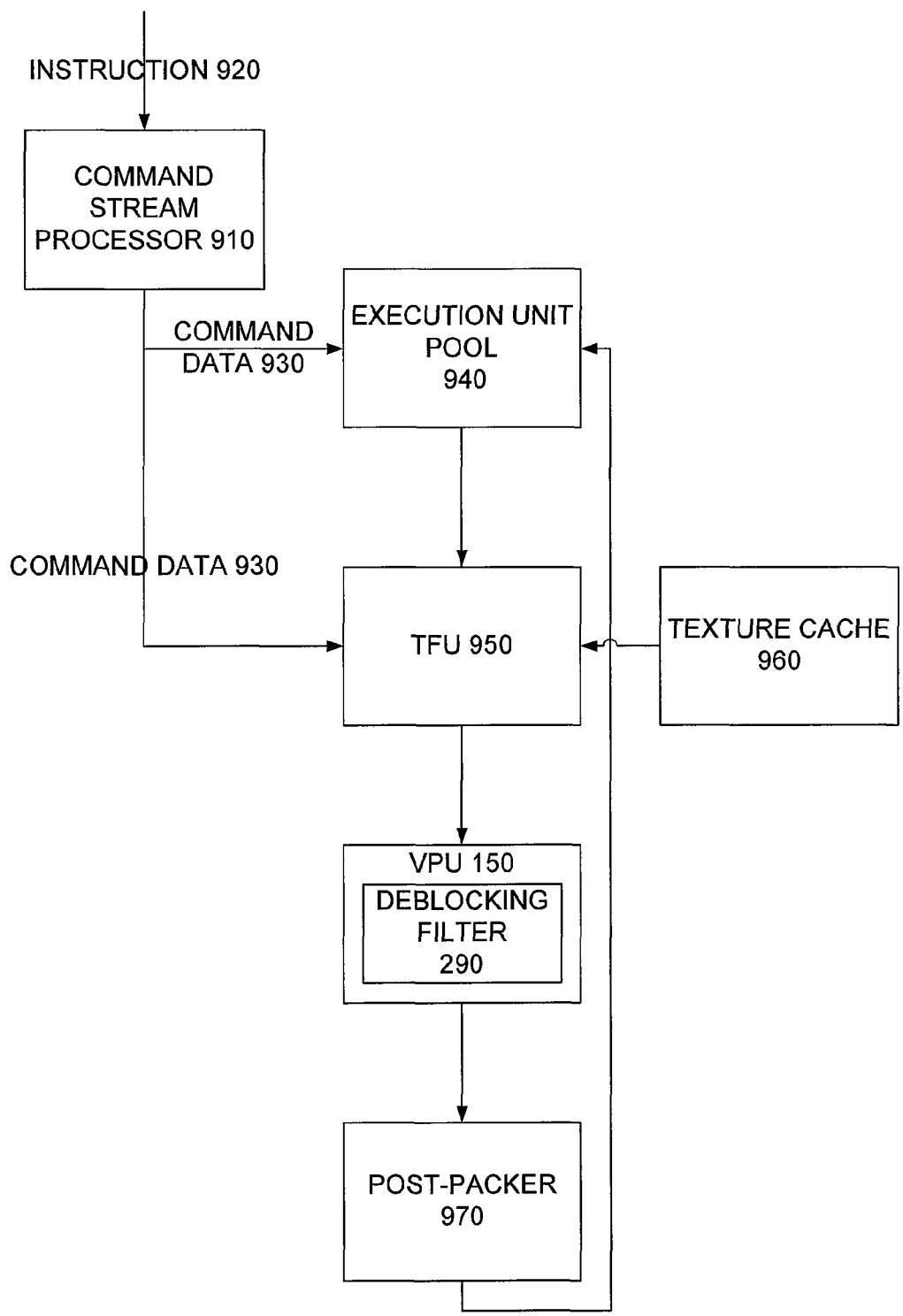
FIG. 9 is a data flow diagram for the GPU 120 from FIG. 1.

FIG. 9 is a data flow diagram for GPU 120, in which command flow is shown by arrows on the left portion of FIG. 9, and flow of image or graphics data is shown by arrows on the right. Omitted from FIG. 9 are a number of conventional components, known to those skilled in the art, that are unnecessary to explain the inloop deblocking features of GPU 120. A command stream processor 910 receives an instruction 920 over a system bus (not shown) and decodes the instruction, producing command data 930, such as vertex data. GPU 120 supports conventional graphics processing instructions, as well as instructions which accelerate video encoding and/or decoding. In some embodiments, command stream processor 910 includes an instruction decoder.

Conventional graphics instructions involve tasks such as vertex shading, geometry shading, and pixel shading. For this reason, command data 930 is supplied to a pool of shader execution units (940). Execution units 940 make use of a texture filter unit (TFU) 950 as needed, for example, to apply a texture to a pixel. Texture data is cached in texture cache 960, which is backed by main memory (not shown).

Some instructions are passed to video accelerator 150, whose operation will be described below. Data produced by is further processed by post-packer 970, which compresses the data. After post-processing, data produced by video acceleration unit 150 is provided to pool of execution units 940.

Execution of video encode/decode acceleration instructions, such as the deblocking filter instructions described herein, differs in several respects from execution of conventional graphics instructions as described above. First, video acceleration instructions are executed by video acceleration unit 150, rather than by shader execution units 940. Second, video acceleration instructions do not use texture data, per se.

However, both the image data used by video acceleration instructions and the texture data used by graphics instructions are two-dimensional arrays. GPU 120 takes advantage of this similarity, using TFU 950 to load image data for video acceleration unit 150, thus allowing texture cache 960 to cache some of the image data operated on by video acceleration unit 150. For this reason, video acceleration unit 150 is located as shown in FIG. 9, between TFU 950 and post-packer 970.

TFU 950 examines command data 930 extracted from instruction 920. Command data 930 further provides TFU 950 with coordinates of the desired image data within texture cache 960. In one embodiment, these coordinates are specified as U,V pairs, which should be familiar to a person of ordinary skill in the art. When instruction 920 is a video acceleration instruction, the extracted command data 930 further instructs TFU 950 to bypass texture filters (not shown) within TFU 950.

In this manner, TFU 950 is leveraged for video acceleration instructions to load image data for video acceleration unit 150. video acceleration unit 150 receives image data from TFU 950 in the data path, and command data 930 from the command path, and performs an operation on the image data according to command data 930. The resulting image data output by video acceleration unit 150 is fed back to pool of execution units 940, after further processing by post-packer 970.

Deblocking Instructions

The embodiment of GPU 120 described herein provides hardware acceleration for the VC-1 deblocking filter and the H.264 deblocking filter. The VC-1 deblocking filter accelerator is accessed by one GPU instruction ("IDF_VC-1"), while the H.264 deblocking filter accelerator is accessed by three GPU instructions ("IDF_H264_0", "IDF_H264_1", and "IDF_H264_2").

As explained earlier, each GPU instruction is decoded and parsed into command data 930, which can be viewed as a set of parameters specific to each instruction, shown in Table 1. The IDF_H264_x instructions share some common parameters, while others are specific to one instruction. A person of ordinary skill in the art should understand that these parameters can be encoded using a variety of opcodes and instruction formats, so these topics will not be discussed here.

TABLE 1

Parameters for IDF_H264 Instructions

| Parameter | Size | Operand | Description |
| --- | --- | --- | --- |
| FieldFlag (Input) | 1-bit | | If FieldFlag == 1 then Field Picture, else Frame Picture |
| TopFieldFlag (Input) | 1-bit | | If TopFieldFlag == 1 then Top-Field-Picture, else Bottom-Field-Picture if FieldFlag is set. |
| PictureWidth (Input) | 16-bit | | e.g., 1920 for HDTV |
| PictureHeight (Input) | 16-bit | | e.g., 1080 for 30P HDTV |
| YC Flag | 1-bit | Control-2 | Y plane or Chrominance Plane |
| Field Direction | 1-bit | Control-1 | |
| CBCR Flag | 1-bit | Control-1 | Cb or Cr |
| BaseAddress (Input) | 32-bit unsigned | | For IDF_H64_0 and IDF_H64_0: Sub-block Base Address in Texture Memory |
| BlockAddress (Input) | 13.3 format, with fractional | SRC1[0:15] = U SRC1[31:16] = V | For IDF_H64_0: Texture Coordinates of Entire Sub-Block (relative to Base Address) For IDF_H64_1: Texture Coordinates of |

TABLE 1-continued

Parameters for IDF_H264 Instructions

| Parameter | Size | Operand | Description |
|---|---|---|---|
| | part ignored | | remaining half of Sub-Block (relative to Base Address) Not used in IDF_H64_2 |
| DataBlock1 | 4x4x8-bit | | Not used in IDF_H64_0 |
| | | SRC2[127:0] | For IDF_H64_1: either the Top or the Left half of the sub-block, depending on FilterDirection encoded in Control 2 parameter |
| | | SRC2[127:0] | For IDF_H64_2: First (Even) register pair |
| DataBlock2 | 4x4x8-bit | | Not used in IDF_H64_0 or IDF_H64_1 |
| | | SRC2[255:128] | For IDF_H64_2: Second (Odd) register pair |
| Sub-block (Output) | 128-bit | | Deblocked 8x4x8-bit subblock (128-bit) |

Several input parameters, used in combination, determine the address of the 4×4 block to be fetched by TFU 950. The BaseAddress parameter points to the start of the texture data within the texture cache. The top-left coordinate of the block within this region is given by the BlockAddress parameter. The PictureHeight and PictureWidth input parameters are used to determine the extent of the block, i.e., the bottom-left coordinates. Finally, the video picture may be progressive or interlaced. If interlaced, it consists of two fields (top and bottom fields). The TFU 950 uses the FieldFlag and TopField-Flag to properly handle interlace images.

The deblocked 8×48×-bit output is provided in a destination register, and is also written back to the appropriate execution unit 940 (e.g., the one from which the instruction was dispatched). Writing the deblocked output back to execution unit 940 is a "modify in place" operation, which is desirable in some decoder implementations such as H.264 where the pixel values in blocks to the right and bottom depend on the previous results computed. However, the VC-1 decoder is not as restrictive in this regard as H.264. In VC-1, every 8×8 boundaries (first vertical, then horizontal) are filtered. All vertical edges can therefore be performed substantially in parallel, with 4×4 edges filtered after that. Parallelism can be exploited because only the two pixels (one on either side of the edge) may be updated, and these pixels are not used in the computation of the other edges.

Since deblocked data is written back to execution unit 940 rather than to texture cache 960, different IDF_H264_x instructions are provided which allow sub-blocks to be fetched from different locations. This can been seen in Table 1, in the description of the Block Address, Data Block 1, and Data Block 2 parameters. The IDF_H264_0 instruction fetches the entire 8×4×8-bit sub-block from texture cache 960. The IDF_H264_1 instruction fetches half of the sub-block from texture cache 960 and half from execution unit 940. The IDF_H64_2 instruction fetches the entire sub-block from the execution unit 940.

The use of IDF_H64_X instruction variations by decoder 160 will be discussed in more detail in connection with FIG. 10. Next is a description of the process by which TFU 950 and execution unit 940 transform fetched pixel data before supplying this data to video acceleration unit 150.

Transformation of Image Data

The instruction parameters, described above, provide TFU 950 with coordinates of the desired sub-block to be fetched from texture cache 960 or from execution unit 940. Image data contains luminance (Y) and chrominance (Cb, Cr) planes. A YC flag input parameter specifies whether the Y plane or the CbCr plane is being processed.

When processing luminance (Y) data, as indicated by the YC flag parameter, TFU 950 fetches the subblock and provides the 128 bits as input to VC-1 IDF hardware acceleration logic 400 (e.g., as the Block input parameter in the example VC-1 accelerator of FIG. 4). The resultant data is written to destination registers as a register quad (i.e., DST, DST+1, DST+2, DST+3).

When processing chrominance data, as indicated by the YC flag parameter, the Cb and Cr blocks will be processed consecutively by VC-1 IDF hardware acceleration logic 400. The resultant data is written to texture cache 960. In some embodiments, this write occurs over two cycles, with each cycle writing 256 bits.

Some video acceleration unit embodiments use interleaved CbCr planes, each stored as half-width and half-height. In these embodiments, TFU 950 de-interleaves CbCr sub-block data for video acceleration unit 150 into a buffer used to communicate between TFU 950 and video acceleration unit 150. Specifically, TFU 950 writes two 4×4 Cb blocks into the buffer, and then writes two 4×4 Cr blocks into the buffer. The 8×4 Cb block is processed first by VC-1 IDF hardware acceleration logic 400, and the resultant data is written to texture cache 960. The 8×4 Cb block is processed next by VC-1 IDF hardware acceleration logic 400, and the resultant data is written to texture cache 960. Video acceleration unit 150 uses the CbCr flag parameter to manage this sequential process.

Use of Deblocking Instructions by Software Decoder

As discussed earlier in connection with FIG. 1, decoder 160 runs on host processor 110 but also takes advantage of video acceleration instructions provided by GPU 120. Specifically, embodiments of H.264 Inloop deblocking filter 290 use particular combinations of the IDF_H264_x instructions to process edges in the order specified by H.264, fetching some sub-blocks from texture cache 960 and others from execution unit 940. When used in appropriate combinations, these IDF_H264_x instructions achieve back-to-back pixel reads and writes.

FIG. 10 is a block diagram of a 16×16 macroblock as used in H.264. The macroblock is subdivided into sixteen 4×4 sub-blocks, each of which undergoes deblocking. The four sub-blocks in FIG. 10 can be identified by row and column (e.g., R1, C2). H.264 specifies that vertical edges are processed first, then horizontal edges, in the edge order shown in FIG. 10 (*a-h*).

Thus, the deblocking filter is applied to edges between pairs of sub-blocks, with sub-block pairs filtered in this order:

```
edge a=[block to left of R1,C1]| [R1,C1] ; [block to left of R2,C1]|
    [R2,C1] ; [block to left of R3,C1]| [R3,C1];
    [block to left of R4,C1]| [R4,C1]
edge b=[R1,C1]| [R2,C2] ; [ R2,C1]|[R2,C2] ;
    [R3,C1]| [R3,C2] ; [ R4,C1]|[R4,C2] ;
edge c=[R1,C2]| [R2,C3] ; [ R2,C2]|[R2,C3] ;
    [R3,C2]| [R3,C3] ; [ R4,C2]|[R4,C3] ;
edge d=[R1,C3]| [R2,C4] ; [ R2,C3]|[R2,C4] ;
    [R3,C3]| [R3,C4] ; [ R4,C3]|[R4,C4] ;
edge e=[block to top of R1,C1]| [R1,C1] ; [block to top of
    R1,C2]|[R1,C2] ; [block to top of R1,C3]| [R1,C3];
    [block to top of R1,C4]| [R1,C4]
edge f=[R1,C1]| [R2,C1] ; [R1,C2]|[R2,C2] ;
    [R1,C3]| [R2,C3]; [R1,C4]|[R2,C4]
edge g=[R2,C1]| [R3,C1] ; [R2,C2]|[R3,C2] ;
    [R2,C3]| [R3,C3]; [R2,C4]|[R3,C4]
edge h=[R3,C1]| [R4,C1] ; [R3,C2]|[R4,C2] ;
    [R3,C3]| [R4,C3]; [R3,C4]|[R4,C4]
```

For the first pair of sub-blocks, both are loaded from texture cache 960, since no pixels in the macroblock have yet been changed by application of the filter. Although the filter for the first vertical edge (a) can change pixel values in (R1, C1), the vertical edge of the second row does share any pixels in the vertical edge of the first row. Therefore, the second pair of sub-blocks (edge b) is also loaded from texture cache 960. Since vertical edges between adjacent rows do not share pixels, the same holds true for the third pair (edge c) and fourth pairs (edge d) of sub-blocks.

The particular IDF_H264_x instruction issued by inloop deblocking filter 290 determines the location from which pixel data is loaded. Thus, the sequence of IDF_H264_x instructions used by inloop deblocking filter 290 to process the first vertical edge (a) is:

```
IDF_H264_0 SRC1=address of (R1,C1);
IDF_H264_0 SRC1=address of (R2,C1);
IDF_H264_0 SRC1=address of (R3,C1);
IDF_H264_0 SRC1=address of (R4,C1);
```

Next, inloop deblocking filter 290 processes the second vertical edge (b), starting with (R1,C2). The leftmost 4 pixels in the 8×4 sub-block specified by (R1,C2) overlap with the rightmost pixels in the (R1,C1) sub-block. These overlapping pixels which were processed by, and possibly updated by, the vertical edge filter for (R1,C1) are therefore be loaded from execution unit 940 instead of texture cache 960. However, the rightmost 4 pixels in the (R1,C2) sub-block have not yet been filtered, and are therefore loaded from texture cache 960. The same holds true for sub-blocks (R2,C2) to (R4,C2). Inloop deblocking filter 290 accomplishes this result by issuing the following sequence of IDF_H264_x to process the second vertical edge (b):

```
IDF_H264_1 SRC1=address of (R1,C2);
IDF_H264_1 SRC1=address of (R2,C2);
IDF_H264_1 SRC1=address of (R3,C2);
IDF_H264_1 SRC1=address of (R4,C2);
```

When the third vertical edge (c) is processed, starting with (R1,C3), the leftmost 4 pixels in the 8×4 sub-block (R1,C3) overlap with the rightmost pixels in the (R1,C2) sub-block, and must therefore be loaded from execution unit 940 instead of texture cache 960. However, the rightmost 4 pixels in the (R1,C2) sub-block have not yet been filtered, and are therefore loaded from texture cache 960. The same holds true for sub-blocks (R1,C2) to (R4,C2). An analogous situation occurs for the last vertical edge (d). Thus, inloop deblocking filter 290 issues the following sequence of IDF_H264_x to process the remaining vertical edges c and d:

```
IDF_H264_1 SRC1=address of (R1,C3);
IDF_H264_1 SRC1=address of (R2,C3);
IDF_H264_1 SRC1=address of (R3,C3);
IDF_H264_1 SRC1=address of (R4,C3);
IDF_H264_1 SRC1=address of (R1,C4);
IDF_H264_1 SRC1=address of (R2,C4);
IDF_H264_1 SRC1=address of (R3,C4);
IDF_H264_1 SRC1=address of (R4,C4);
```

Horizontal edges (e-h) are processed next. At this point, the deblocking filter has been applied to every sub-block in the macroblock, and thus every pixel may have been updated. For this reason, each sub-block submitted for horizontal edge filtering is loaded from execution unit 940 rather than texture cache 960. Thus, inloop deblocking filter 290 uses the issues the following sequence of IDF_H264_x to process horizontal edges:

```
IDF_H264_2 SRC1=address of (R1,C1);
IDF_H264_2 SRC1=address of (R2,C1);
IDF_H264_2 SRC1=address of (R3,C1);
IDF_H264_2 SRC1=address of (R4,C1);
IDF_H264_2 SRC1=address of (R1,C2);
IDF_H264_2 SRC1=address of (R2,C2);
IDF_H264_2 SRC1=address of (R3,C2);
IDF_H264_2 SRC1=address of (R4,C2);
IDF_H264_2 SRC1=address of (R1,C3);
IDF_H264_2 SRC1=address of (R2,C3);
IDF_H264_2 SRC1=address of (R3,C3);
IDF_H264_2 SRC1=address of (R4,C3);
IDF_H264_2 SRC1=address of (R1,C4);
IDF_H264_2 SRC1=address of (R2,C4);
IDF_H264_2 SRC1=address of (R3,C4);
IDF_H264_2 SRC1=address of (R4,C4);
```

In this manner, complex filtering operations are exposed through the GPU instruction set. The entire inloop deblocking filtering operations is typically too complex to be implemented as a single-instruction filter. For example, the H.264 filter is complex in that it includes a horizontal pass and a vertical pass. Furthermore, the block size is relatively large. Therefore, rather than building hardware to manage the control aspects of the filter, single instructions are combined into sequences (e.g., macros), so that the sequences are used to process 4×4 blocks. This allows use of the resources of the execution unit, which are already present, thus minimizing the need for the complex control structures in the IDF, which in turn reducing hardware and memory requirements inside the IDF unit. On the other hand, implementing these filtering instructions within inloop deblocking filter 290 rather than through instructions executing on the execution unit is advantageous because the filtering involves some scalar operations (e.g., data swizzling, table look-up, conditional filtering) which are not efficient on the vector-based execution unit.

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The systems and methods disclosed herein can be implemented in software, hardware or a combination thereof. In some embodiments, the system and/or method is implemented in software that is stored in a memory and is executed by a suitable processor (including but not limited to a microprocessor, microcontroller, network processor, reconfigurable processor, or extensible processor) situated in a computing device. In other embodiments, the system and/or method is implemented in logic, including but not limited to a programmable logic device (PLD), programmable gate array (PGA), field programmable gate array (FPGA), or application specific circuit (ASIC). In still other embodiments, the logic described herein is implemented within a graphics processor or graphics processing unit (GPU).

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A graphics processing unit (GPU) comprising:
    a decoder configured to decode a first and a second deblocking filter acceleration instruction, the first and second deblocking filter acceleration instructions both associated with a deblocking filter used by a particular video decoder; and
    a video processing unit configured to receive first parameters encoded by the first deblocking filter acceleration instruction, and to determine a first memory source specified by the received first parameters as one of a plurality of memory sources located on the GPU, and to receive second parameters encoded by the second deblocking filter acceleration instruction, and to determine a second memory source specified by the received second parameters as one of the plurality of memory sources located on the GPU,
    wherein the video processing unit is further configured to load a first block of pixel data from the determined first memory source, and to apply the deblocking filter to the first block of pixel data, and to load a second block of pixel data from the determined second memory source, and to apply the deblocking filter to the second block of pixel data.

2. The GPU of claim 1, wherein the first memory source and the second memory source are utilized to achieve back-to-back pixel reads and writes.

3. The GPU claim 1, wherein the plurality of memory sources includes a texture cache within the GPU and an execution unit within the GPU.

4. The GPU of claim 1, wherein the first and second memory sources are both a texture cache within the GPU.

5. The GPU of claim 1, wherein the first memory source is a texture cache within the GPU and the second memory source is an execution unit within the GPU.

6. The GPU of claim 1, wherein the first and second memory sources are both an execution unit within the GPU.

7. The GPU of claim 1, wherein the deblocking filter acceleration instruction is associated with the filter used by the H.264 video decoder.

8. A graphics processing unit (GPU) comprising:
    a video processing unit configured to apply a deblocking filter associated with a particular video decoder;
    a decoder configured to decode a plurality of deblocking filter acceleration instructions associated with the deblocking filter; and
    a texture filter unit configured to provide pixel data to the video processing unit for application of the deblocking filter;
    an execution unit configured to perform a graphics processing function on pixel data,
    wherein the video processing unit is further configured to receive parameters encoded by each of the deblocking filter acceleration instructions, and to determine whether a first memory source specified by the received parameters corresponds to the texture filter unit or the execution unit, and to determine whether a second memory source specified by the received parameters corresponds to the texture filter unit or the execution unit,
    wherein the video processing unit is further configured to load a first block of pixel data from the first memory source and a second block of pixel data from the second memory source, and to apply the deblocking filter to the first block of pixel data and to apply the deblocking filter to the second block of pixel data in accordance with the received parameters.

9. The GPU of claim 8, wherein the video processing unit is further configured to apply the deblocking filter in accordance with at least one filter configuration parameter, and the execution unit is further configured to compute the at least one filter parameter based on the first block of pixel data.

10. The GPU of claim 9, wherein the deblocking filter acceleration instruction is associated with the filter used by the H.264 video decoder.

11. The GPU of claim 10, wherein the first memory source specified by the received parameters corresponds to the texture filter unit, and the second memory source specified by the received parameters corresponds to the execution unit to achieve back-to-back pixel reads and writes.

12. A video encoder comprising:
- a plurality of execution unit instructions configured to compute at least one inloop deblocking filter configuration parameter associated with a block of pixel data and with a filter used by a particular video encoding specification, and further configured to execute on a shader execution unit within a graphics processing unit (GPU); and
- a plurality of inloop deblocking filter (IDF) instructions configured to apply an inloop deblocking filter in accordance with the computed filter configuration parameter, and further configured to execute on a video processing unit within the GPU.

13. The video encoder of claim 12, wherein the at least one filter parameter is boundary strength, alpha, or beta.

14. The video encoder of claim 8, wherein the deblocking filter acceleration instruction is associated with the filter used by the H.264 video decoder.

15. The video encoder of claim 12, wherein one of the plurality of IDF instructions specifies a first memory source for the block of pixel data, and another one of the plurality of IDF instructions specifies a second memory source for another block of pixel data, both of the memory sources located on the GPU.

16. The video encoder of claim 15, wherein the first and second memory sources are both a texture cache within the GPU.

17. The video encoder of claim 15, wherein the first memory source is a texture cache within the GPU and the second memory source is an execution unit within the GPU.

18. The video encoder of claim 15, wherein the first and second memory sources are both an execution unit within the GPU.

* * * * *